Figure 1:
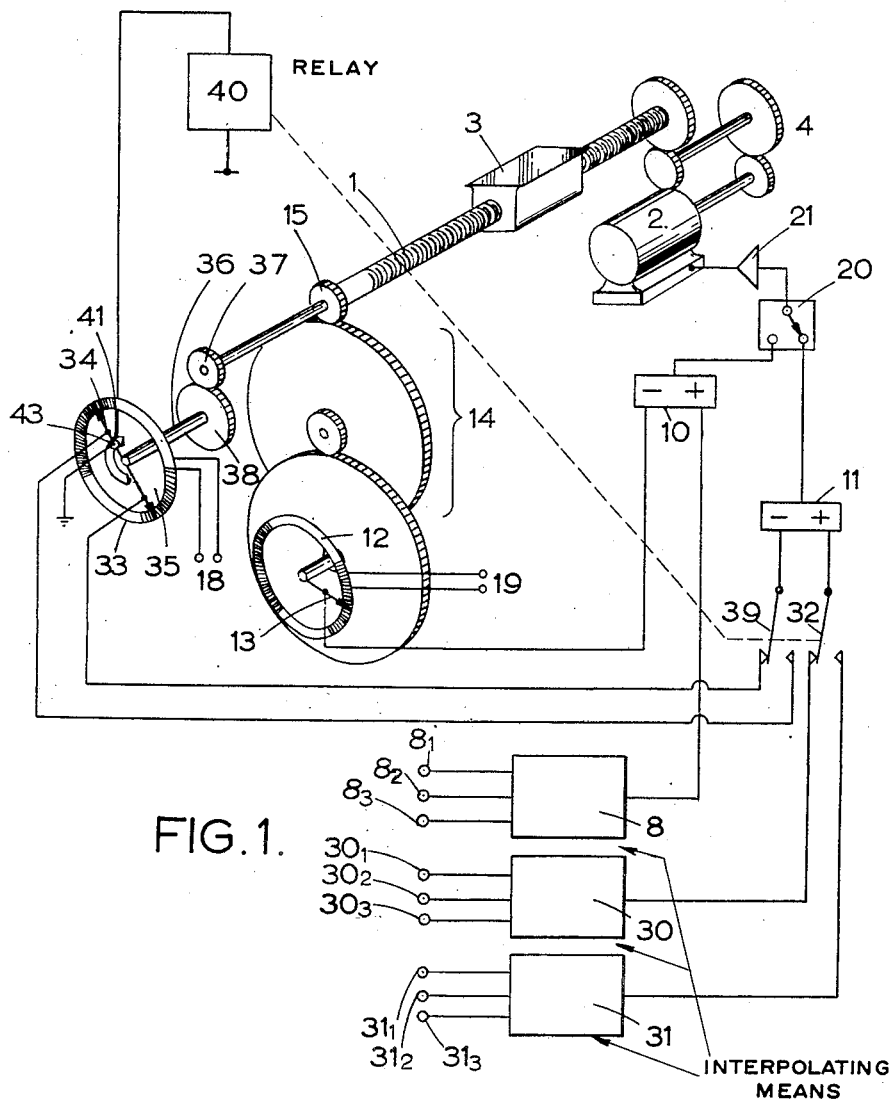

Oct. 1, 1957  R. E. SPENCER  2,808,548
AUTOMATIC CONTROL SYSTEMS ESPECIALLY FOR MACHINE TOOLS
Filed Oct. 18, 1954  4 Sheets-Sheet 1

INVENTOR
R. E. Spencer
ATTORNEYS

Oct. 1, 1957  R. E. SPENCER  2,808,548
AUTOMATIC CONTROL SYSTEMS ESPECIALLY FOR MACHINE TOOLS
Filed Oct. 18, 1954  4 Sheets-Sheet 3

FIG. 2.

| INSTRUCTION | | 1st PART | 2nd PART |
|---|---|---|---|
| DECIMAL | BINARY | | |
| 1137 | 0001000 1110001 | 0001000·1 (=8.5 × 128) | (0)1110001 (=113) |
| 1154 | 0001001 0000010 | 0001001·0 (=9 × 128) | (1)0000010 (=2) |
| 1174 | 0001001 0010110 | 0001001·0 (=9 × 128) | (1)0010110 (=22) |
| 1202 | 0001001 0110010 | 0001001·0 (=9 × 128) | (1)0110010 (=50) |
| 1279 | 0001001 1111111 | 0001001·1 (=9.5 × 128) | (1)1111111 (=127) |
| 1290 | 0001010 0001010 | 0001010·0 (=10 × 128) | (0)0001010 (=10) |
| 1298 | 0001010 0010010 | 0001010·0 (=10 × 128) | (0)0010010 (=18) |

INVENTOR
R. E. Spencer
by
ATTORNEY

United States Patent Office 2,808,548
Patented Oct. 1, 1957

2,808,548

AUTOMATIC CONTROL SYSTEMS ESPECIALLY FOR MACHINE TOOLS

Rolf Edmund Spencer, West Ealing, London, England, assignor to Electric & Musical Industries Limited, Hayes, England, a corporation of Great Britain Application October 18, 1954, Serial No. 463,017

Claims priority, application Great Britain October 21, 1953

8 Claims. (Cl. 318—28)

This invention relates to automatic control systems, in particular to apparatus for continuously controlling the displacement of an element, such as the angular displacement of a shaft, as a function of a variable. The invention is especially applicable to automatic machine tools for controlling, say, the angular position of a shaft in response to numerical instructions fed to the machine.

In an automatic machine tool it may be necessary to control continuously the angular position of a shaft in response to instructions applied to the machine. The instructions may be, for example, in the form of numbers representing the angular position which the shaft is required to assume at discrete times. In order to provide a continuous control for the shaft it is necessary to interpolate between the numbers in question, and a form of interpolation device which is suitable for use in the circumstances indicated is described in co-pending United States patent application Serial No. 459,814 filed on October 1, 1954, by R. E. Spencer et al. An interpolating device such as described in this application requires input signals in voltage analogue form. It is moreover usual to derive the numbers from a punched tape or other record in which the numbers are recorded in digital form so that it is necessary to provide means for converting the numbers to analogue form before feeding them to the interpolating device. In a practical application an accuracy of one part in ten thousand or more may be necessary and this requires a high degree of accuracy in setting up the voltage analogues and interpolating between them. Moreover, the output of the interpolating device usually forms the input of a servo system which effects the necessary shaft displacements, and if an accuracy of one part in ten thousand is required the usual feedback potentiometers employed in the servo system also require a high degree of accuracy.

The attainment of the necessary accuracy involves practical difficulties and the object of the present invention is to reduce such difficulties.

According to the present invention there is provided apparatus for continuously controlling the displacement of an element in response to an input function, comprising servo means for displacing said element, means for deriving a first electrical analogue signal variable from one limiting value to another in response to a predetermined displacement of said element, means for deriving a second electrical analogue signal variable repetitively from one limiting value to another in response to said predetermined displacement, whereby a variation of said second analogue signal from one limit to another represents a unit part of said displacement, means for deriving a continuously variable coarse input signal which is a coarse representation of successive values of said function, means for deriving a continuously variable fine input signal which represents the fractional part of the respective values of said function, one at least of said means for deriving input signals comprising means for deriving discrete value signals from a record of such signals and means for interpolating among groups of said discrete value signals to derive the respective continuously variable signal, first comparison means for comparing said coarse input signals and said first analogue signal to derive a first difference signal, second comparison means for comparing said fine input signal and said second analogue signal to derive a second difference signal, said servo means being respective selectively to said difference signals to displace said element.

Assuming that the element is a shaft and the servo means is arranged to impart angular displacement to the shaft, a coarse control signal may then represent the number of complete revolutions to be imparted to the shaft from a datum position together with an approximation to the fractional part of a revolution, whereas the fine control signal represents accurately the fractional part of the revolution to be combined with a number of complete revolutions to yield the desired displacement.

According to one form of the invention the means for deriving the fine control signal comprises means for interpolating between signals representing the lower digits of discrete values of the variable. When the fine control signal is derived by interpolation in this way a difficulty arises because the fine control signal is confined to a limited range and sudden transitions of the represented values may occur from one limit of said range to the other limit. For instance, considering the case of the angular displacement of the shaft the digits corresponding to successive fine control signals increase from a minimum to a maximum during a one revolution of the shaft and revert to a minimum again when the shaft starts another subsequent revolution. There is therefore a risk of indeterminacy in the output of the interpolating means for the fine control signal since the interpolating means must receive inputs representing more than one discrete value of the lower digits at any one time, and therefore at various times it may receive signals spanning abrupt transitions from maximum to minimum. In the form of the invention in which the fine control signal is derived from interpolating means such indeterminacy is avoided by taking account of the value of the next digit above the lower digits which are represented in the fine control signal.

Figure 1A:
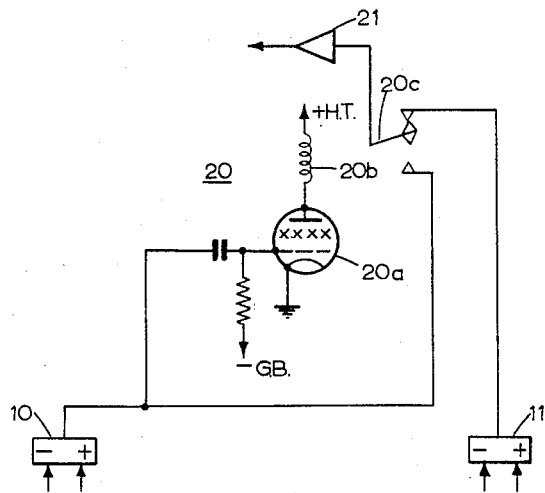
Figure 4:
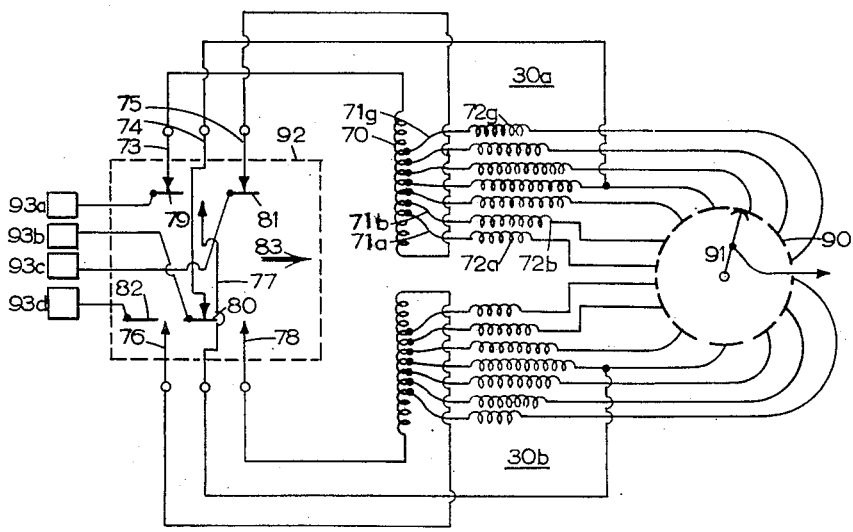
Figure 3:
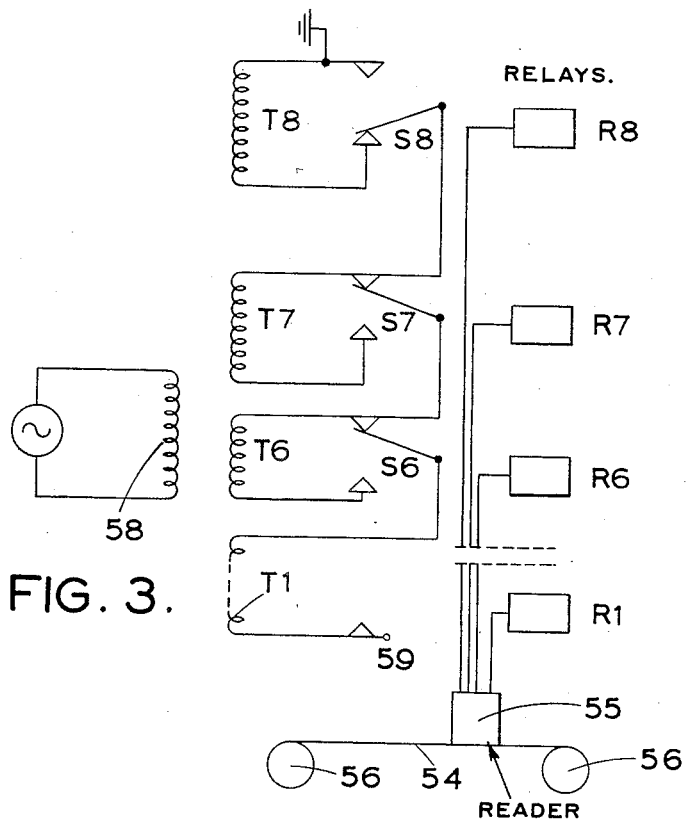
Figure 5:
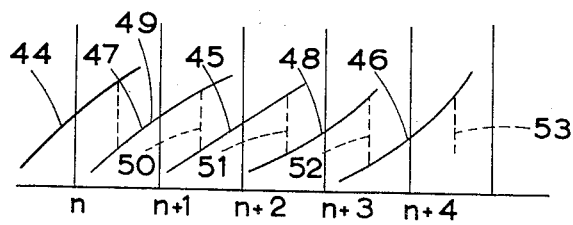

In order that the invention may be clearly understood and readily carried into effect, the invention will be described with reference to the accompanying drawings, in which:

Figure 1 illustrates diagrammatically one example of the first-mentioned form of the present invention applied to apparatus for the automatic control of the angular position of the shaft, Figure 1a is a detail view of part of Figure 1, Figure 2 is a chart explanatory of the operation of Figure 1, Figure 3 illustrates diagrammatically a pick-up device and a digital to analogue conversion circuit for use in association with Figure 1, Figure 4 illustrates diagrammatically an interpolator for use in Figure 1, Figure 5 is a waveform diagram explanatory of the operation of Figure 1.

Referring to the drawing, 1 denotes a shaft whose angular position has to be continuously controlled by means of a servo motor 2. The shaft 1 is screw-threaded and it will be assumed that it controls the position of a worktable in a milling or other automatic machine, the worktable being connected to the shaft 1 by means of a nut 3. The servo motor is coupled to the shaft 1 by means of gearing shown in general by the reference 4. Instructions for the control of the angular position of the shaft 1 are applied to the machine in the form of numbers representing the angular position to be assumed by the shaft at discrete times during operation of the machine. The numbers are recorded in binary digital code form in a punched tape or other suitable record medium and it will be assumed that the numbers in column 5a of the chart shown in Figure 2 represent a series of recorded instructions. Column 5a shows the decimal form of the numbers and column 5b shows the binary code form into which they are coded preparatory to recording. The binary code numbers in column 5b are not, however, recorded as such but each binary number is recorded as two other binary numbers each containing eight digits. The two binary numbers representing any given instruction are referred to as the coarse and fine control parts of the instruction. Column 6 gives the coarse control parts and column 7 gives the fine control parts of the instructions in column 5b. It will be observed that the coarse control part of each instruction comprises the eight digits of greatest significance in the corresponding number of column 5b and can be regarded as representing the contribution of the seven higher digits (that is the digits to the left of the dotted line in column 5b and representing the $2^{13}$ to $2^7$ digits) plus an approximation to the remaining digits. The fine control part of each instruction has also eight digits, the first being a representation of the $2^7$ digit the remaining seven being the seven lower digits (that is to the right of the dotted line in column 5b and representing the $2^6$ and $2^0$ digits). The first digit in the fine control part of each instruction (in the $2^7$ place) can be regarded as an extra digit and such digits have been enclosed in brackets in Figure 3 to identify them clearly.

The outlines denoted by reference 8 in Figure 1 represents an interpolating device of the construction disclosed in the aforesaid United States patent application Serial No. 459,814. The device 8 has three inputs $8_1$, $8_2$, $8_3$ and in operation of the apparatus alternating voltages having amplitudes representing the numbers in column 6 of Figure 2 are applied in succession, in groups of three, to the terminals of the interpolating device 8. The construction of a device for converting the digital code signals to an alternating voltage analogue will be referred to subsequently. The output of the interpolating device 8 forms one input to a differencing circuit 10. References 30 and 31 denote two interpolating devices which are employed for interpolating the fine control instructions. The devices 30 and 31 have input terminals $30_1$, $30_2$, $30_3$ and $31_1$, $31_2$, $31_3$ respectively and the outputs of the devices 30 and 31 are selectively applied to one input terminal of a differencing circuit 11 by means of a switch 32. The circuit 10 receives an alternating current second input from a potentiometer 12 and this input is subtracted from that received from the device 8. The tap 13 of potentiometer 12 is driven by gearing 14 such that the tap 13 makes one revolution for each 128 revolutions of the shaft 1, which will be asumed to cover the full range of the nut 3. A second input for the differencing circuit 11 is derived from an alternating current potentiometer 33 having two brushes 34 and 35 mounted 180° apart on a shaft 36 driven from the shaft 1 through reduction gears 37 and 38. These gears give a 2:1 reduction so that the shaft 36 makes one revolution for each two revolutions of the shaft 1. The voltages set up on the brushes 34 and 35 are applied selectively to the differencing circuit 11 via a switch 39. The switches 32 and 39 are controlled by a single relay 40. The control circuit for the relay includes a 180° sector stud 41 which is engaged by a contact 43 on the brush 34 during alternate half revolutions thereof. The effect of the contact 43 engaging and disengaging the stud 41 is to reverse the condition of the switches 32 and 39 at a predetermined point during each revolution of the shaft 1. The output of the differencing circuit 10 is applied to one input terminal of a switch 20 and the output of the differencing circuit 11 is applied to the other input terminal of this switch. The switch 20 selectively connects one of the input terminals to the input of the servo motor via an amplifier 21. The switch 20 may be composed of a simple rectifying and amplifying circuit as shown in Figure 1a consisting of a single valve 20a operating as an anode-bend detector having in its anode circuit the operating coil 20b of a relay. This relay has an armature 20c which carries one contact such that when the output from the differencing circuit 10 exceeds a critical magnitude which is not greater than $\frac{1}{128}$ of the full scale voltage applied to the potentiometer 12 the anode current of the valve rises to a value sufficient to cause the contact carried by the armature to connect to the output of 10 rather than that of 11 to which it is otherwise connected.

In operation of the arrangement described the output of the interpolating device 8 provides a coarse control signal for the servo motor 2 while the output of the interpolating devices 30 and 31 alternately provide a fine control signal. The switch 20 is so constructed that the servo motor 2 receives its input from the device 8 so long as there is any significant output from the differencing circuit 10. If however there is no significant output from the differencing circuit 10 the switch 20 automatically switches over so that the servo motor receives its input from the one or other of the devices 30 and 31. Therefore, in operation, the interpolating device 8 initially causes the servo motor to set the angular position of the shaft 1 to an accuracy of one part in about 128. When the shaft 1 has been set to this accuracy by the device 8, the devices 30 and 31 then take over and provide a continuous fine control to an accuracy of the order of one part in 10,000, both fine and coarse control signals having the same order of magnitude. Device 8 only assumes control again if there is an abrupt change of instructions e. g. if a new operation is commenced.

In order to explain how the devices 30 and 31 alternately provide a fine control signal from the servo motor 20, reference will be made in Figures 3, 4 and 5 of the drawings.

In Figure 3 reference 54 represents diagrammatically the punched tape or other record on which are recorded the coarse and fine control parts of the instructions represented in columns 6 and 7 of Figure 2. The record extends between spool 56 and any suitable form of driving means may be employed. Reference 55 represents a pick-up device for deriving binary pulse code signals corresponding to the fine control part of the instructions recorded on the record 54. The pick-up device for the coarse control part of the instructions is not shown. The derived pulses are fed to a series of relays R1 . . . R8 a pulse representing the lowest digit being fed to R1, a pulse representing the next digit being fed to R2 and so on. The extra digit in the fine control part of the instruction is fed to relay R8. The relays R1 . . . R8 operate a series of switches S1 . . . S8 of which only the last three are represented in the drawing. The switches are associated with a series of transformer secondary windings T1 . . . T8 which have a common primary winding 58 to which an alternating voltage of reference amplitude is fed from a suitable source. The secondary windings T1 . . . T7 have predetermined numbers of turns such that the electro-motive force induced across the winding T2 by the voltage across the primary winding 58 has twice the amplitude of that induced across T1. Similarly the electro-motive force induced across the winding T3 has twice the amplitude of that induced across T2 and so on. The switches S1 . . . S8 are such that in one condition of each switch the corresponding winding is connected in a series circuit between ground and an output terminal 59 from which signals can be applied to the interpolating device 30. Moreover the relays R1 . . . R7 are arranged in such a way that when they receive a pulse representing digits of value 1 they switch the appropriate secondary windings into the series circuit, the windings being otherwise open circuited to represent a digit value 0. However switch S8 is connected in reverse compared with the other switches so that the winding T8 is connected in the series circuit when the extra digit in the final control part of the instruction has value zero and is open circuited when the extra digit has value 1. The interpolating device 30 requires three inputs simultaneously and for digital-to-analogue converters (which also function as temporary stores) are required, three to provide the inputs to the interpolating device at any one time and one to allow for the changeover. The routing of the fine control parts of the instructions to the appropriate converters may be effected by any suitable cyclic switching circuit, for example, by means of a circuit such as described in copending United States patent application Serial No. 459,794 filed on October 1, 1954, by G. H. Stevenson et al. The interpolating device 31 also requires four digital-to-analogue converters and these may be of the same construction as that illustrated in Figure 3 except for the switch S8 which in this case is connected in the same way as the remaining switches. The pick-up device 55 can also serve the converters for the interpolating device 31 since the converters for the device 31 receive the same input signals from the tape 54 as the converters for the device 30. It will therefore be appreciated that in the analogues fed to the interpolating device 31 the extra digit (2⁷ place) of the fine control part of each construction is utilised without modification in forming the analogue of the recorded digital representation. On the other hand in converting the fine control part of each construction to analogue form for use in the interpolating device 30 a digit of value 0 in the 2⁷ place is taken as having the value 1 and a digit of value 1 is taken as having the value 0.

Figure 4 illustrates one form of construction which may be adopted for any of the interpolating means 8, 30 or 31. The construction shown is of simplified form of Figure 6 of the aforesaid co-pending United States application Serial No. 459,814, means for producing so-called linear sub-interpolation having been omitted from the accompanying Figure 5 in order to simplify the description, though it will be appreciated that such means may be employed in the present invention if desired. The interpolating means illustrated, which will be assumed to be the means 30 comprises two individual interpolators 30a and 30b of the same construction and these interpolators are taken into service alternately, two such interpolators being employed to facilitate the change over from one group of three inputs to the succeeding group of three inputs, there being two common inputs in successive groups. The interpolator 30a comprises an auto-transformer 70 to which a series of conductors 71a, 71b ... 71g, are tapped at equi-spaced points on the auto-transformer. The conductors lead to respective studs which form one half of a stud circle 90 which is traversed by a contact brush 91 rotated at a rate relative to the rate of feeding inputs to the interpolators, and thus to the rate of advance of the tape 54 (Figure 3). Only a relative small number of studs and a correspondingly small number of leads are shown in Figure 4 but in practice the number may of course be larger. A further series of transformer windings 72a, 72b ..., 72g, which are inductively coupled together but are not inductively coupled to the transformer 70, are connected as shown in the conductors 71a, 71b ..., these windings having numbers of turns which are related in accordance with a quadratic law. The other interpolator 30b is of the same construction and need not be described. The interpolator 30a has three input points connected to brushes 73, 74 and 75 forming part of switch 92 and the interpolator 30b has, similarly three input points connected to brushes 76, 77 and 78 of the switch 92. Brushes 73 to 78 traverse contacts 79, 80, 81 and 82 which are connected respectively to the output terminals of converters and temporary stores 93a, 93b, 93c, 93d, each of which is of the construction shown in Figure 3 and to which the input signals derived from the tape 54 are applied in cyclic order. In operation of the switch 92 the brushes traverse the contacts cyclically in the direction indicated by the arrow 83 so as to apply the voltage analogues set up by the converters and stores to the interpolators as required, there being only three active inputs to the interpolating means 30 at any one time, as represented by the three input terminals $30_1$, $30_2$ and $30_3$ in Figure 1. The switch 92 may be in the form of a commutator. The output of the interpolator is derived from the brush 91 which is of the make-before-break type so that the output is a continuous alternating voltage whose amplitude varies to represent desired displacements of the nut 3 at successive closely spaced points on the parabola through the three points represented by the input signals. The output signal from the interpolator can be said to be a continuously variable signal in the sense that the brush 91 is never open-circuited in operation of the device so that there is a continuous control on the servo-motor 2 from one or other of the interpolators 8, 30 and 31 although in fact the amplitude of the continuously variable control signal may vary in small steps.

Figure 5 is a graph of the outputs of the interpolating devices and in this figure the abscissae can be taken as representing time. The vertical lines $n$, $n+1$, $n+2$, $n+3$ ... represent the start of successive complete revolutions of the shaft 1. The lines 44, 45 and 46 represent the amplitude of the voltage output from the interpolating device 30 during successive pairs of revolutions of the shaft 1 and similarly the lines 47 and 48 represent the output of the interpolating device 31 during successive pairs of revolutions of the shaft 1. It will be observed that the output of 30 rises from a minimum to a maximum during two revolutions of the shaft, reverts suddenly to a minimum and again rises to a maximum during the next two revolutions, and so on. There may be some indeterminacy in the output of the interpolators about the time of reversal, since the group of inputs applied to an interpolator at any one time may have two inputs which are near one end of the scale and one which is near the other end of the scale, but as will appear such indeterminacy during reversal has no effect on the operation and so the reversals are not shown in the drawing. The same is true of the device 31 but the maxima and minima are displaced by 360° (referred to rotation of the shaft) relative to the output of 30. The first instruction in Figure 2 may for example be represented by the point 49 in Figure 5 and at this time the device 31 is operative to provide the control signal to the servo motor 2 whilst the brush 34 provides the feedback to the servo motor indicative of the angular position of the shaft. After the completion of the ($n$)th revolution, the device 31 and brush 34 continue to provide the input signals for the servo motor until the contact 43 disengages the stud 41. This situation is represented by the dotted line 50 in Figure 2. Relay 40 then reverses the switches 32 and 39, and device 30 and brush 35 take over the function of providing the error signal for the servo motor 2. Since brush 35 lags the brush 34 by 360° (referred to rotation of the shaft) the feedback signal is decreased instantaneously by the analogue of one revolution of the shaft. However, the output of the device 30 is less than the output of the device 31 by the same amount since as aforesaid the 2⁷ digit is given the value 0 when it is 1 in the instruction. Therefore the instantaneous switching between the devices 30 and 31 and the brushes 34 and 35 enables a continuous smooth control to be maintained on the servo motor notwithstanding the indeterminacy which appears in the outputs of the devices 30 and 31 at the end of alternate revolutions of the shaft. The dotted lines 51, 52 and 53 represent successive reversals of the relay 40 following that represented by the dotted line 50. In this way, indeterminacy in the fine control signal is prevented by taking account of the value of the digit next above the highest digit used in forming the fine control signal.

Thus the signal fed to the interpolating devices 30 and 31 is alternately increased by an amount representing unit change of said digit (that is the extra digit in column 7) in response to changes in the value of said digit, the switch 32 alternately rendering the outputs of the interpolating devices effective as the fine control signal.

The digital to analogue converters for the interpolating device 8 may be of the same construction as those for device 31.

The invention is not confined to the control of the angular displacement of a shaft but may be applied to other systems for continuously controlling an analogue quantity. For example, the apparatus shown in Figure 1 may be used to drive a signal generator for producing pre-interpolated continuous analogue signals for controlling other machines. The invention also may be employed for inspecting a workpiece either in the rear of the tool or after an operation on the workpiece has been finished. In this case, the work piece is sensed by a feeler whose instantaneous position is indicated by a potentiometer, goniometer or the like, the output of which is in turn compared with an output derived from apparatus according to the present invention. The difference between the compared outputs is a measure of the error in the workpiece, and may be employed to produce a record of the error; for example, by means of a recording galvanometer or to operate a warning signalling device.

The output of an interpolating device such as described in the aforesaid co-pending United States patent application Serial No. 459,814 is an alternating voltage, whereas a D. C. voltage is generally required for the operation of a servo motor. Therefore, it is to be understood that the device represented by 21 includes means for rectifying the interpolated voltages.

What I claim is:

1. Apparatus for continuously controlling the displacement of an element in response to an input function, comprising servo-means for displacing said element, means for deriving a first electrical analogue signal variable from one limiting value to another in response to a predetermined displacement of said element, means for deriving a second electrical analogue signal variable repetitively from one limiting value to another in response to said predetermined displacement, whereby a variation of said second analogue signal from one limit to another represents a unit part of said displacement, means for deriving coarse input signals representing higher digits of successive discrete values of said function, means for interpolating within successive groups of said coarse input signals to derive a first continuously variable signal, first comparison means for comparing said first continuously variable signal and said first analogue signal to derive a first difference signal, means for deriving a second continuously variable signal representing lower digits of successive values of said function, second comparison means for comparing said second continuously variable signal and said second analogue signal to derive a second difference signal, and means for applying said first and second difference signals selectively to said servo-means in dependence on one of said difference signals.

2. Apparatus for continuously controlling the displacement of an element in response to an input function, comprising servo-means for displacing said element, means for deriving a first electrical analogue signal variable repetitively from one limiting value to another in response to predetermined displacement of said element, means for deriving a second electrical analogue signal similarly variable as said first analogue signal and having a middle value when the first analogue signal has a limiting value, whereby a variation of either analogue signal from one limit to the other represents two unit parts of said displacement, means for deriving input signals respectively representing fractional parts of successive discrete values of said function, first interpolating means for deriving a first continuously variable signal in response to groups of said input signals, second interpolating means for deriving a second continuously variable signal in response to groups of said input signals, means for feeding the same successive groups of input signals to said first and second interpolating means, means for increasing input signals to said first interpolating means by a representation of unity in alternate unit ranges of said function, means for increasing the input signals to said second interpolating means by a representation of unity in intervening unit ranges of said function, comparison means for deriving a signal alternately representing the difference between said first continuously variable signal and said first analogue signal and the difference between said second continuously variable signal and said second analogue signal, and means for applying the signal derived by said comparison means to said servo-means, said comparison means being pre-arranged to switch from one difference to the other at intermediate points in unit ranges to the displacement of said element.

3. Apparatus for continuously controlling the displacement of an element in response to an input function comprising servo-means for displacing said element, means for deriving a first electrical analogue signal variable from one limiting value to the other in response to a predetermined displacement to said element, means for deriving a second electrical analogue signal variable repetitively from one limiting value to the other in response to said predetermined displacement, means for deriving a third electrical analogue signal similarly variable as said second analogue signal and having a middle value when said second analogue signal has a limiting value, whereby a variation of either said second or third analogue signal from one limit to another represents two unit parts of said displacement, means for deriving coarse input signals representing respectively whole unit parts of successive discrete values of said function together with an approximation to the fractional parts thereof, means for deriving fine input signals respectively representing fractional parts of successive discrete values of said function, first interpolating means for deriving a first continuously variable signal from successive groups of said coarse input signals, second interpolating means for deriving a second continuously variable signal in response to groups of said fine input signals, third interpolating means for deriving third continuously variable signal in response to groups of said fine input signals, means for feeding the same successive groups of said fine input signals to said second and third interpolating means, means for increasing the input signals to said second interpolating means by a representation of unity in alternate unit ranges of said function, means for increasing the input signals to said third interpolating means by a representation of unity in intervening unit ranges of said function, first comparison means for comparing said first continuously variable signal and said first analogue signal to derive a first difference signal, second comparison means for deriving a difference signal alternately representing the difference between said second continuously variable signal and said second analogue signal and the difference between said third continuously variable signal and said third analogue signal, means for selectively applying said first and second difference signals to said servo means in dependence on one of said difference signals, said second comparison means being pre-arranged to switch from one difference to the other at intermediate points in unit ranges of the displacement of said element.

4. Apparatus according to claim 2, said means for deriving the input signals comprising means for deriving digital signals from a record of such signals in which each recorded signal comprising the fractional part of the respective discrete value of the function and an extra digit which changes value at each unit change of the function values, first means for converting said digital signals into electrical analogue signals for said first interpolating means, second means for converting said digital signals into electrical analogue signals for said second interpolating means, said first and second interpolating means each including means responsive to the signal representing said extra digit for selectively increasing the analogue signals by a representation of unity.

5. Apparatus according to claim 2 said first and second interpolating means comprising quadratic interpolators.

6. Apparatus according to claim 1 said means for deriving the coarse input signal comprising means for reproducing digital code signals from a record of such signals, and means for converting the reproduced digital code signals to corresponding electrical analogue signals.

7. Appaartus according to claim 2 said means for deriving input signals comprising means for reproducing digital code signals from a record of such signals and means for converting the reproduced digital code signals to corresponding electrical analogue signals.

8. Apparatus for continuously controlling the displacement of an element in response to an input function, comprising servo means for displacing said element, means for deriving the first electrical analogue signal variable from one limiting value to another in response to a predetermined displacement of said element, means for deriving a second electrical analogue signal variable repetitively from one limiting value to another in response to said predetermined displacement, whereby a variation of said second analogue signal from one limit to another represents a unit part of said displacement, means for deriving a continuously variable coarse input signal which is a coarse representation of successive values of said function, means for deriving a continuously variable fine input signal which represents the fractional part of the respective values of said function, one at least of said means for deriving input signals comprising means for deriving discrete value signals from a record of such signals and means for interpolating among groups of said discrete value signals to derive the respective continuously variable signal, first comparison means for comparing said coarse input signal and said first analogue signal to derive a first difference signal, second comparison means for comparing said fine input signal and said second analogue signal to derive a second difference signal, said servo means being responsive selectively to said difference signals to displace said element.

References Cited in the file of this patent

UNITED STATES PATENTS

| | | |
|---|---|---|
| 2,566,831 | Grosdoff | Sept. 4, 1951 |
| 2,630,481 | Johnson | Mar. 3, 1953 |
| 2,630,552 | Johnson | Mar. 3, 1953 |
| 2,643,355 | Hallman | June 23, 1953 |
| 2,656,497 | Schweighofer et al. | Oct. 20, 1953 |

FOREIGN PATENTS

| | | |
|---|---|---|
| 670,841 | Great Britain | Apr. 23, 1952 |